(12) United States Patent
Son

(10) Patent No.: US 12,039,134 B2
(45) Date of Patent: Jul. 16, 2024

(54) VEHICULAR DISPLAY APPARATUS HAVING FORCE SENSOR OF VARIABLE CONTACT AREA

(71) Applicant: HYUNDAI MOBIS CO., LTD., Seoul (KR)

(72) Inventor: Ho Won Son, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/985,279

(22) Filed: Nov. 11, 2022

(65) Prior Publication Data

US 2023/0359306 A1  Nov. 9, 2023

(30) Foreign Application Priority Data

May 3, 2022 (KR) ........................ 10-2022-0054896

(51) Int. Cl.
*G06F 3/041* (2006.01)
*B60K 35/00* (2024.01)
*B60K 35/10* (2024.01)
*G06F 3/044* (2006.01)

(52) U.S. Cl.
CPC ...... *G06F 3/04186* (2019.05); *G06F 3/04142* (2019.05); *G06F 3/044* (2013.01); *B60K 35/00* (2013.01); *B60K 35/10* (2024.01); *B60K 2360/143* (2024.01); *G06F 3/0412* (2013.01); *G06F 2203/04105* (2013.01)

(58) Field of Classification Search
CPC ............ G06F 3/04186; G06F 3/04142; G06F 3/044; G06F 3/041; G06F 3/0412; G06F 3/0416; G06F 3/046; G06F 2203/04105; B60K 35/00; B60K 35/10; B60K 2360/143
See application file for complete search history.

(56) References Cited

U.S. PATENT DOCUMENTS

| | | | |
|---|---|---|---|
| 10,782,833 B2 * | 9/2020 | Lee .................... | G06F 3/04142 |
| 10,809,830 B2 * | 10/2020 | Kim ........................ | G01L 1/2281 |
| 2011/0096025 A1 * | 4/2011 | Slobodin ............... | G06F 3/0447 345/174 |
| 2016/0274710 A1 * | 9/2016 | Bulea .................... | G06F 3/0488 |
| 2017/0300161 A1 * | 10/2017 | Filiz .......................... | G01L 1/16 |
| 2020/0183530 A1 * | 6/2020 | Kim ......................... | G06F 3/0446 |
| 2021/0089168 A1 * | 3/2021 | Patel ....................... | G06F 3/0446 |
| 2021/0223119 A1 * | 7/2021 | Moriura .................. | G01L 1/146 |

(Continued)

FOREIGN PATENT DOCUMENTS

KR    10-2170961 B1    10/2022

*Primary Examiner* — Darlene M Ritchie
(74) *Attorney, Agent, or Firm* — NovoTechIP International PLLC

(57) ABSTRACT

A vehicular display apparatus includes a display panel, a force sensor attached on a bottom surface of the display panel, and a variable geometry electrode disposed under the force sensor with a certain interval between the variable geometry electrode and the force sensor, wherein the force sensor measures a force touch of a user based on a variation of a contact area or the certain interval between the variable geometry electrode and the force sensor caused by the force touch of the user transferred through the display panel, for determining touch manipulation intention of the user with respect to the display panel.

14 Claims, 5 Drawing Sheets

(56) References Cited

U.S. PATENT DOCUMENTS

2022/0011915 A1* 1/2022 Lee .................. G01L 1/127
2022/0161741 A1* 5/2022 Beau ................. B32B 9/007
2022/0397466 A1* 12/2022 Ide ................... G01L 1/146

* cited by examiner

VEHICULAR DISPLAY APPARATUS HAVING FORCE SENSOR OF VARIABLE CONTACT AREA

CROSS-REFERENCE TO RELATED APPLICATIONS

This application claims the benefit of the Korean Patent Application No. 10-2022-0054896 filed on May 3, 2022, which is hereby incorporated by reference as if fully set forth herein.

TECHNICAL FIELD

The present invention relates to a vehicular display apparatus, and more particularly, to a vehicular display apparatus for reducing an execution error of an application caused by a user-undesired screen touch.

BACKGROUND

As electric vehicles and autonomous driving vehicles increase, the demands of consumers for enhancing the quantitative and qualitative functions of an in-vehicle display system are increasing. One of such consumer demands is for reducing an error where an application is executed based on a user-undesired screen touch.

In order to reduce such an error, it should be possible to determine whether a screen is touched based on user intension (i.e., whether the user touches the screen intentionally) or is intentionally or mistakenly touched, and an application should be thereby selected based on a result of the determination.

However, research on display technology for determining whether to execute an application based on user intention is insufficient at present.

SUMMARY

An aspect of the present invention is directed to providing a vehicular display apparatus for reducing an execution error of an application caused by a user-undesired screen touch.

To achieve these and other advantages and in accordance with the purpose of the invention, as embodied and broadly described herein, there is provided a vehicular display apparatus including: a display panel; a force sensor attached on a bottom surface of the display panel; and a variable geometry electrode disposed under the force sensor with a certain interval between the variable geometry electrode and the force sensor.

In an embodiment, the force sensor may measure a force touch of a user based on a variation of a contact area or the certain interval between the variable geometry electrode and the force sensor caused by the force touch of the user transferred through the display panel, for determining touch manipulation intention of the user on the display panel.

In an embodiment, the force touch may be a variation amount of a capacitance based on the variation of the contact area or the interval.

In an embodiment, the force sensor may be provided to have a line pattern extending along an edge of the display panel.

In an embodiment, the force sensor may be provided in a plate shape.

In an embodiment, the force sensor may be provided to have a rectilinear pattern In an embodiment, the force sensor may be provided in an alphabet capital 'E'-shape.

In an embodiment, the vehicular display apparatus may further include a damper maintaining the certain interval between the force sensor and the variable geometry electrode.

In another aspect of the present invention, there is provided a vehicular display apparatus including: a display panel; a force sensor attached on a bottom surface of the display panel to measure a force touch of a user transferred through the display panel; a sensor controller configured to compare a reference pressure value with the force touch of the user to determine whether there is touch manipulation intention of the user on the display panel; and an application processor configured to execute or stop an application designated at a point, touched by the user, of the display panel, based on a result of the determination of the sensor controller.

In an embodiment, when the force touch of the user is greater than or equal to the reference pressure value, the sensor controller may determine that there is the touch manipulation intention of the user on the display panel, and when the force touch of the user is less than the reference pressure value, the display panel may be touched unlike intention of the user.

In an embodiment, when there is the touch manipulation intention of the user on the display panel according to the determination result of the sensor controller, the application processor may execute the application, and otherwise, the application processor may stop the execution of the application.

In an embodiment, the vehicular display apparatus may further include a variable geometry electrode disposed under the force sensor with a certain interval between the force sensor and the variable geometry electrode, wherein the force sensor measures, as the force touch of the user, a variation amount of a capacitance value corresponding to a variation of a contact area or an interval between the variable geometry electrode and the force sensor caused by the force touch of the user transferred through the display panel.

In another aspect of the present invention, there is provided an operating method of a vehicular display apparatus, the operating method including: measuring a force touch corresponding to a touch event of a user occurring in a display panel by using a force sensor attached on a bottom surface of a display panel; determining, by using a sensor controller, whether there is touch manipulation intention of the user, based on the force touch transferred from the force sensor; and determining, by using an application processor, whether to execute an application designated at a point of the display panel touched by the user, based on a determination result transferred from the sensor controller.

In an embodiment, the determining may include comparing the force touch with a predetermined reference pressure value to determine whether there is the touch manipulation intention of the user.

In an embodiment, the determining may include: when the force touch is greater than or equal to the reference pressure value, determining that there is the touch manipulation intention of the user on the display panel; and when the force touch is less than the reference pressure value, determining that the display panel is touched unlike intention of the user.

In an embodiment, the determining whether to execute the application may include: executing the application when there is the touch manipulation intention of the user on the display panel, based on the determination result of the sensor controller; and stopping the execution of the application when there is no touch manipulation intention of the user on the display panel, based on the determination result of the sensor controller.

It is to be understood that both the foregoing general description and the following detailed description of the present invention are exemplary and explanatory and are intended to provide further explanation of the invention as claimed.

DETAILED DESCRIPTION

Figure 1:
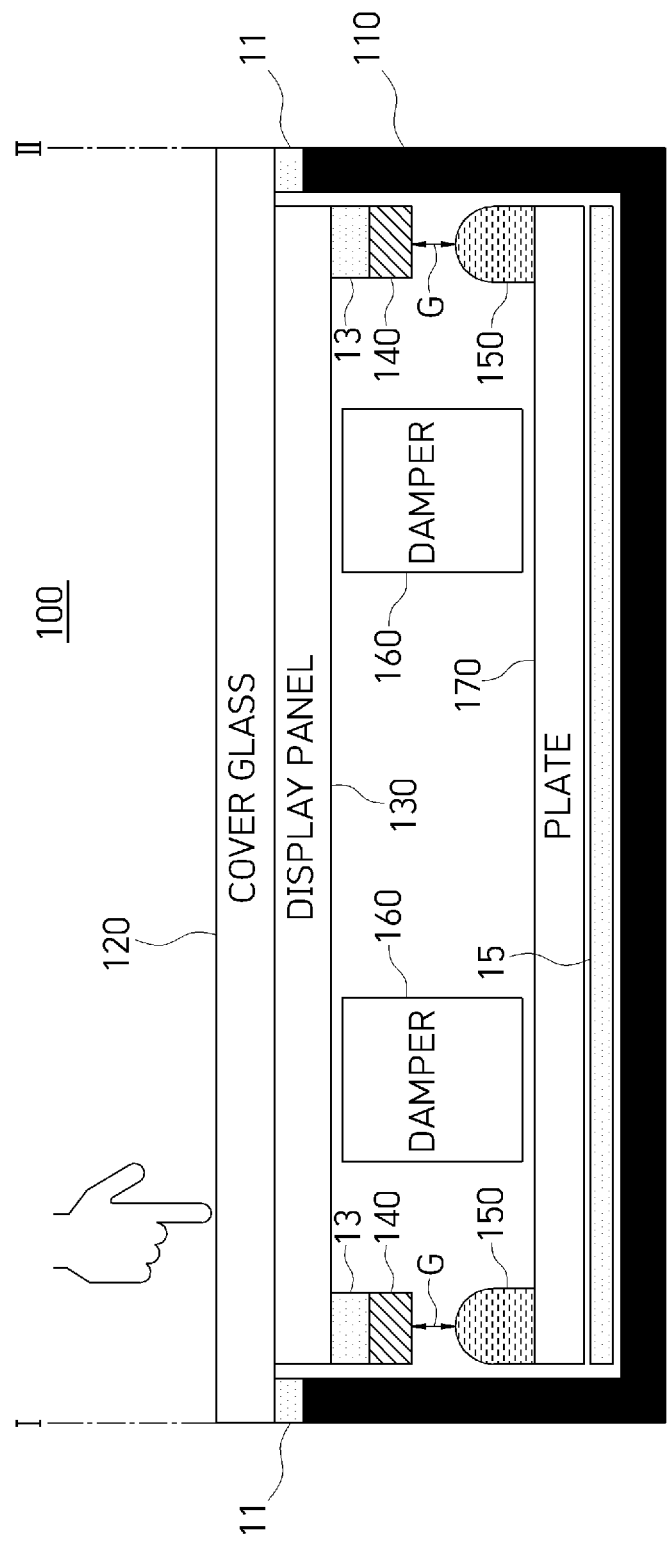
FIG. 1 is a cross-sectional view of a vehicular display apparatus according to an embodiment of the present invention.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Like reference numerals refer to like elements throughout.

Hereinafter, embodiments of the present invention will be described in detail with reference to the accompanying drawings.

FIG. 1 is a cross-sectional view of a vehicular display apparatus 100 according to an embodiment of the present invention.

Referring to FIG. 1, the vehicular display apparatus 100 according to an embodiment of the present invention may be a display apparatus installed in a vehicle, and for example, may be installed as a type where the vehicular display apparatus 100 is embedded in a center fascia or a dashboard.

In order to reduce an error where an application is executed due to a user-undesired (or driver-undesired) screen touch, the vehicular display apparatus 100 according to an embodiment of the present invention may measure a force, with which the user presses a display screen, to determine whether there is touch manipulation intention of the user with respect to the display screen, and when it is determined that there is the touch manipulation intention, the vehicular display apparatus 100 may execute a target application.

To this end, the vehicular display apparatus 100 according to an embodiment of the present invention may include a body 110, a cover glass 120, a display panel 130, a force sensor 140, a variable geometry electrode 150, a damper 160, and a plate 170.

The body 110 may be an element which provides an internal space where an upper portion thereof is opened, and the display panel 130, the force sensor 140, the variable geometry electrode 150, the damper 160, and the plate 170 may be accommodated into the internal space.

The cover glass 120 may include a transparent material (for example, a plastic material) and may be disposed at (or attached on_an upper end of the body 110 by a double-sided tape 11 to cover the opened upper portion of the body 110.

The display panel 130 may be disposed on a bottom surface of the cover glass 120 and may be implemented as a liquid crystal display (LCD) or organic light emitting display (OLED) panel.

The force sensor 140 may be disposed at (or attached on) the bottom surface of the display panel 130 by the double-sided tape 13 and may sense a force touch by a user transferred to the display panel 130 through the cover glass 120.

The variable geometry electrode 150 may be disposed below (or under) and spaced apart from the force sensor 140 with a certain interval G therebetween.

When the force touch by the user is transferred to the display panel 130, a variation of a contact area or the interval G between the force sensor 140 and the variable geometry electrode 150 may occur, and the force sensor 140 may sense, as the force touch by the user, a variation amount of a capacitance value caused by a variation of the interval G or the contact area. In terms of measuring the variation amount of the capacitance value, the force sensor 140 may act as one electrode of a general capacitor, and the variable geometry electrode may act as the other electrode, which is opposite to the one electrode, of the capacitor.

The sensed force touch may be used as information (data) for determining whether the user touches a screen intentionally or touches the screen unintentionally or mistakenly.

The damper (or a rubber damper) 160 may be disposed between the display panel 130 and the below-described plate 170 to maintain the interval G between the force sensor 140 and the variable geometry electrode 150.

Features of the present invention are irrelevant to the kind, material, shape, and manufacturing method of the damper, and thus, detailed descriptions thereof are omitted. If it is possible to maintain the interval G between the force sensor 140 and the variable geometry electrode 150, the kind, material, shape, and manufacturing method of the damper are not limited.

The plate 170 may be attached on an inner floor surface of the body 110 by the double-sided tape 15, and the variable geometry electrode 150 described above may be disposed on a top surface thereof.

Figure 2:
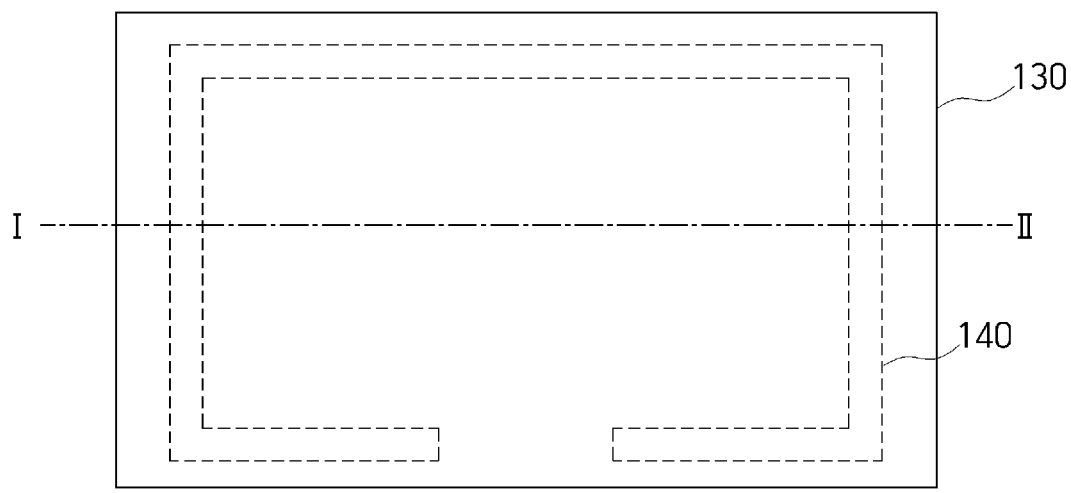
FIG. 2 is a plan view illustrating a pattern of a force sensor attached on a bottom surface of a display panel when the display panel illustrated in FIG. 1 is seen above.

FIG. 2 is a plan view illustrating a pattern of a force sensor attached on a bottom surface of a display panel when the display panel 130 illustrated in FIG. 1 is seen above.

Referring to FIG. 2, the force sensor 140 may be implemented to have various patterns, based on the desired sensing sensitivity and size of the display panel 130. For example, as illustrated in FIG. 2, the force sensor 140 may be formed to have a pattern which extends along an edge (border) of a bottom surface of the display panel 130.

Figure 3:
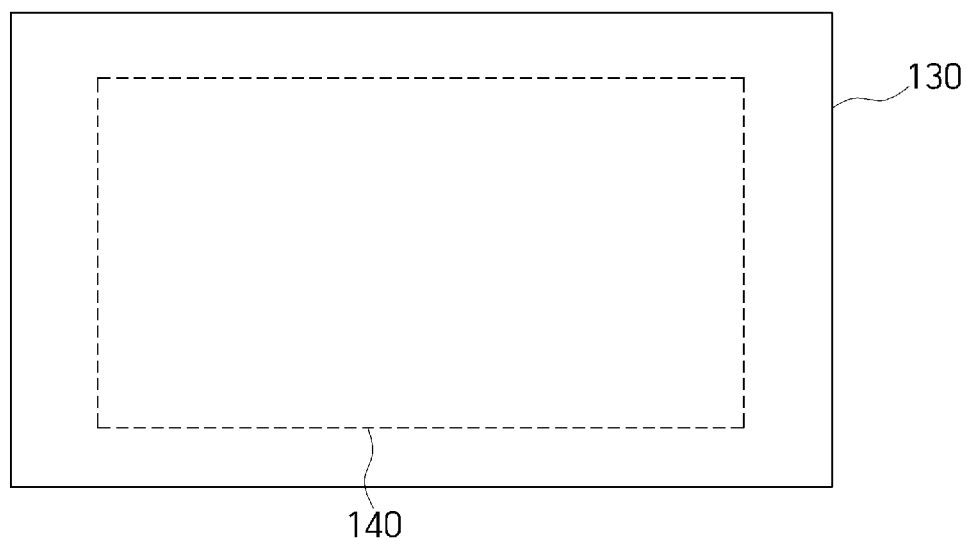
FIG. 3 is a plan view illustrating a pattern of a force sensor according to another embodiment of the present invention.

FIG. 3 is a plan view illustrating a pattern of a force sensor 140 according to another embodiment of the present invention.

Referring to FIG. 3, unlike the embodiment of FIG. 2, the force sensor 140 may be implemented in a plate shape. In this case, because the force sensor 140 is provided all over the bottom surface of the display panel 130, a force touch by a user may be uniformly sensed all over a wide area.

Figure 4:
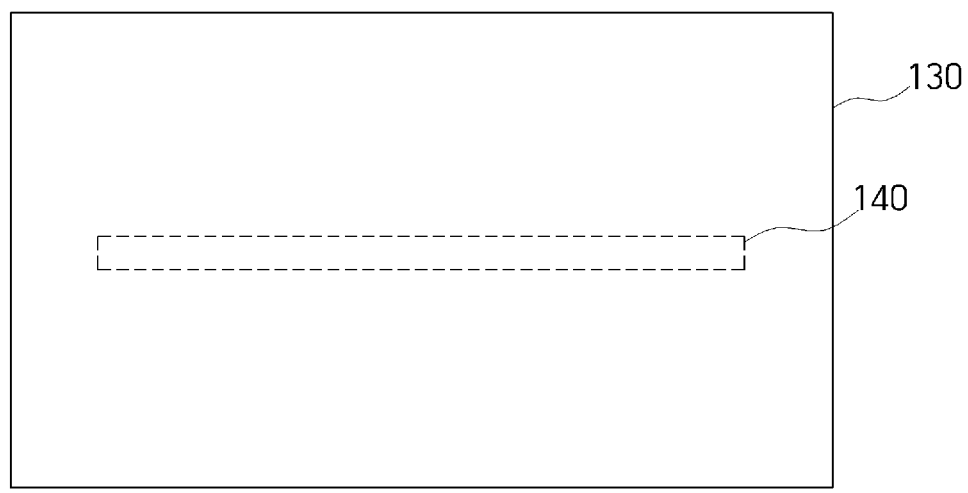
FIG. 4 is a plan view illustrating a pattern of a force sensor according to another embodiment of the present invention.

FIG. 4 is a plan view illustrating a pattern of a force sensor 140 according to another embodiment of the present invention.

Referring to FIG. 4, the force sensor 140 may be implemented in a rectilinear shape or rectilinear pattern shape. In this case, because the force sensor 140 is provided on the bottom surface of the display panel 130 in a rectilinear shape, the force sensor 140 may be suitable for a case where a force sensor is designed to occupy a minimum area of the display panel 130.

Figure 5:
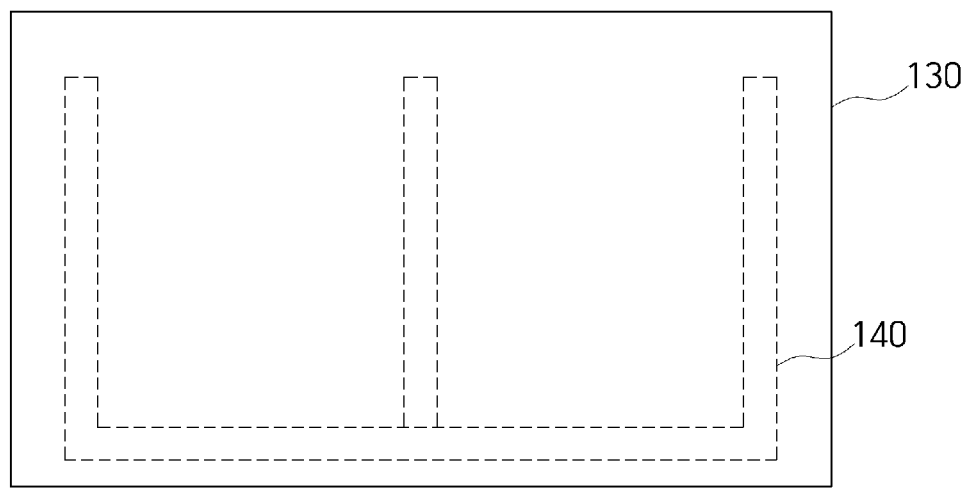
FIG. 5 is a plan view illustrating a pattern of a force sensor according to another embodiment of the present invention.

FIG. 5 is a plan view illustrating a pattern of a force sensor 140 according to another embodiment of the present invention.

Referring to FIG. 5, the force sensor 140 may be implemented in a shape where an alphabet capital 'E' is counter-clockwise rotated by 90 degrees. When the force sensor is designed in an E-shape, a size of the force sensor 140 may be reduced, and moreover, a sensing area may be efficiently enlarged.

The attachment area, dimension, and shape of the force sensor 140 may be changed based on the size, purpose, and desired sensing sensitivity of the display panel 130 in addition to the pattern illustrated in FIGS. 2 to 5.

Figure 6:
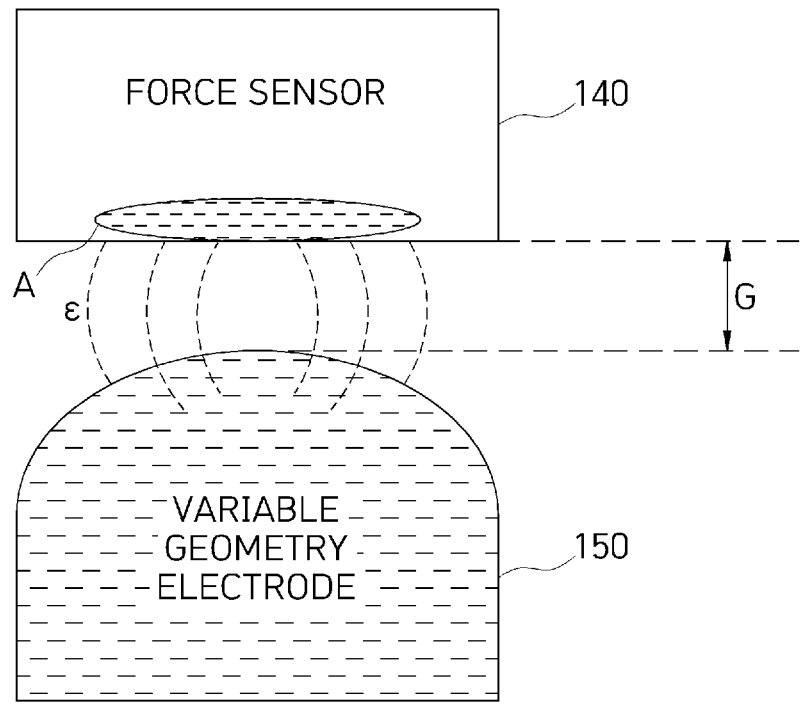
FIG. 6 is a diagram for describing an operation of each of a force sensor and a variable geometry electrode illustrated in FIG. 1.

FIG. 6 is a diagram for describing an operation of each of a force sensor and a variable geometry electrode illustrated in FIG. 1.

In FIG. 6, a reference sign "ε" may denote a permittivity, a reference sign "A" may denote a contact area where the force sensor 140 contacts the variable geometry electrode 150, and a reference sign "G" may denote an interval between the force sensor 140 and the variable geometry electrode 150.

A force touch $C_{pressure}$ of a user measured by the force sensor 140 may be calculated as expressed in the following Equation 1.

$$C_{pressure} = \frac{(\varepsilon \times A)}{G} \quad \text{[Equation 1]}$$

Here, $\varepsilon = \varepsilon_0 \times \varepsilon_s$, $\varepsilon_0$ may denote vacuum (air) permittivity, and $\varepsilon_s$ may denote a relative permittivity (vacuum $\varepsilon s=1$).

Based on Equation 1, a statistical force touch $C_{pressure}$ may be obtained through model-based evaluation such as a contact area and a distance to a force sensor, and a variation of the obtained force touch $C_{pressure}$ may be used to determine whether there is touch manipulation intention of a user.

Figure 7:
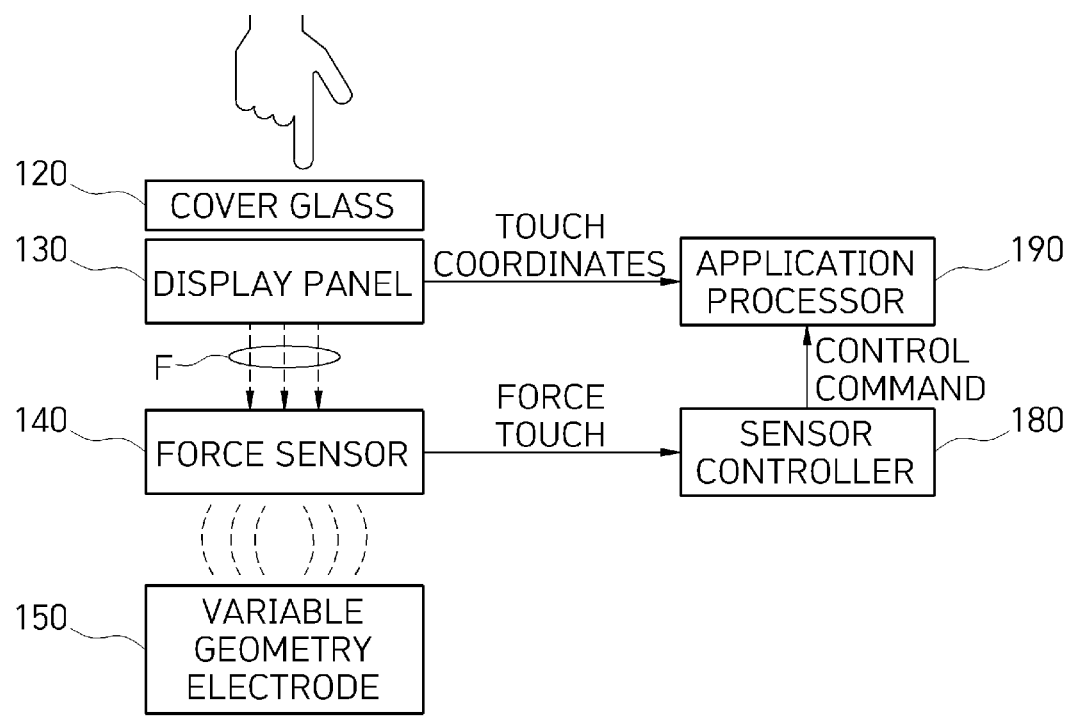
FIG. 7 is a block diagram illustrating the vehicular display apparatus illustrated in FIG. 1 in terms of control.

FIG. 7 is a block diagram illustrating the vehicular display apparatus illustrated in FIG. 1 in terms of control.

Referring to FIG. 7, in terms of control, the vehicular display apparatus according to an embodiment of the present invention may further include a sensor controller 180 and an application processor 190.

To help understand the present invention, the sensor controller 180 and the application processor 190 are differentiated from each other for each function and illustrated in FIG. 7, but the present invention is not limited thereto and the sensor controller 180 and the application processor 190 may be integrated into one element. For example, the sensor controller 180 may be embedded in the application processor 190.

The sensor controller 180 may be an element which controls an overall operation of the force sensor 140, and above all, the sensor controller 180 may compare a reference pressure value with a force touch by a user sensed by the force sensor 140 to determine whether there is touch manipulation intention of the user with respect to the display panel 130 and may transfer a control command to the application processor 190 on the basis of a result of the determination. Here, the control command may include an application execution command and an application execution stop command.

When the user touches the display panel 130 through the cover glass 120, the application processor 190 may execute an application corresponding to touch coordinates transferred from the display panel 130.

Above all, the application processor 190 may not unconditionally execute the application corresponding to the touch coordinates but may stop execution of the application corresponding to the touch coordinates on the basis of a control command transferred from the sensor controller 180. That is, when the application processor 190 receives an execution stop command from the sensor controller 180, the application processor 190 may stop the execution of the application corresponding to the touch coordinates.

To provide a more detailed description, when the force touch by the user is transferred to the display panel 130 through the cover glass 120, the display panel 130 may transfer the force touch to the force sensor 140.

A variation of a contact area or an interval between the force sensor 140 and the variable geometry electrode 150 may occur due to the force touch transferred to the display panel 130 through the cover glass 120.

The force sensor 140 may sense a variation amount of a capacitance value corresponding to the variation of the contact area or the interval between the force sensor 140 and the variable geometry electrode 150 and may transfer the variation amount of the capacitance value as the force touch to the sensor controller 180.

The sensor controller 180 may compare the force touch, transferred from the force sensor 140, with a reference pressure value which is previously set through an experiment value, so as to determine touch manipulation intention of the user, and may analyze whether the display panel 130 is touched unlike intention of the user, or is intentionally touched for performing specific purpose such as execution of the application.

For example, when the force touch is greater than or equal to the reference pressure value, the sensor controller 180 may determine that there is the touch manipulation intention of the user, and otherwise, the sensor controller 180 may determine that the display panel 130 is touched unintentionally.

When it is determined that there is the touch manipulation intention of the user, the sensor controller 180 may transfer an execution control command to the application processor 190, and otherwise, the sensor controller 180 may transfer an execution stop command to the application processor 190.

In a case where the application processor 190 receives the application stop command from the sensor controller 180, even when the application processor 190 receives touch coordinates of a point touched by the user from the display panel 130, the application processor 190 may not execute an application which is set at the touch coordinates.

As described above, in an embodiment of the present invention, whether there is touch manipulation intention of the user with respect to the display panel 130 may be preferentially determined based on the force touch by the user obtained by the force sensor 140, and by executing an application on the basis of a result of the determination, a user-undesired application may be prevented from being executed when the display panel is touched due to the carelessness or mistake of the user.

Figure 8:
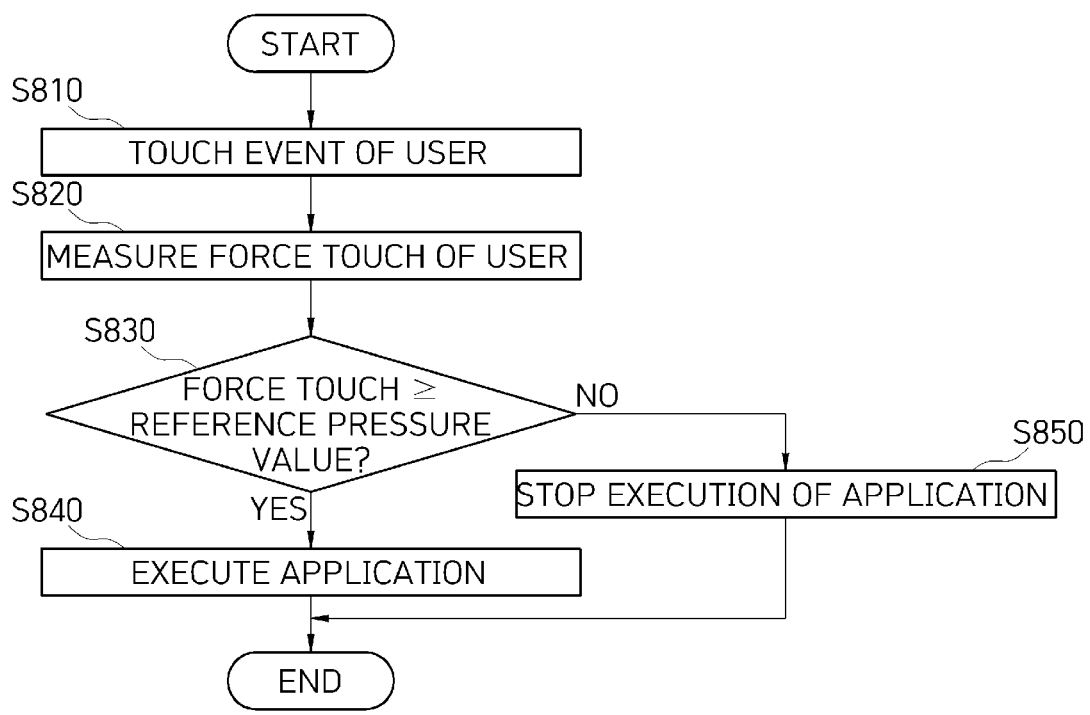
FIG. 8 is a flowchart illustrating an operating method of a vehicular display apparatus according to an embodiment of the present invention.

FIG. 8 is a flowchart illustrating an operating method of a vehicular display apparatus according to an embodiment of the present invention.

Referring to FIG. 8, first, in step S810, a touch event of a user with respect to the display panel 130 may occur.

Subsequently, in step S820, the force sensor 140 attached on the bottom surface of the display panel 130 may measure a force touch by the user corresponding to the touch event with respect to the display panel 130.

Subsequently, in step S830, the sensor controller 180 may compare a reference pressure value with the force touch measured by the force sensor 140 to determine whether there is touch manipulation intention of the user.

Subsequently, in step S840, when the force touch is greater than or equal to the reference pressure value, the sensor controller 180 may determine that there is the touch manipulation intention of the user and may transfer a control command, indicating execution of an application, to the application processor 190, and the application processor 190 may execute the application according to the control command.

Optionally, in step S850, when the force touch is less than the reference pressure value, the sensor controller 180 may determine that the display panel 130 is touched unlike intention of the user and may transfer a control command, indicating the stop of execution of the application, to the application processor 190, and the application processor 190 may stop the execution of the application according to the control command.

As described above, the present invention may measure a force, with which a user presses a display screen, by using a force sensor to accurately determine intention of the user and may execute an application, and thus, may reduce an execution error of the application caused by a user-undesired screen touch.

In future vehicles, internal accessories of vehicles are increasing based on the influence of advancement of electronic equipment technology and autonomous driving performance. As a representative example, a vehicle monitor (LCD or OLED) system is progressively increasing in size and resolution and is being diversified, and in such trends, the requirements of users on display apparatuses applied to vehicles are increasing also. The present invention may sufficiently satisfy the demand of the market for preventing an execution error of an application caused by an undesired screen touch among the requirements.

According to the embodiments of the present invention, user intention may be accurately determined by measuring a force with which a user presses a display screen, thereby reducing an execution error of an application caused by an undesired screen touch.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A vehicular display apparatus comprising:
a display panel;
a force sensor disposed at a bottom surface of the display panel; and
a variable geometry electrode disposed below and spaced apart from the force sensor with an interval therebetween,
wherein the force sensor is configured to:
   measure a force touch by a user transferred through the display panel based on a variation in a capacitance value corresponding to a variation in a contact area of the force touch by the user transferred through the display panel; and
   determine, based on the measured force touch by the user, a touch manipulation intention of the user with respect to the display panel.

2. The vehicular display apparatus of claim 1, wherein the force touch corresponds to the variation in the capacitance.

3. The vehicular display apparatus of claim 1, wherein the force sensor has a linear shape extending along an edge of the display panel.

4. The vehicular display apparatus of claim 1, wherein the force sensor has a planar shape.

5. The vehicular display apparatus of claim 1, wherein the force sensor has a rectilinear pattern shape.

6. The vehicular display apparatus of claim 1, wherein the force sensor has an "E" shape.

7. The vehicular display apparatus of claim 1, further comprising a damper disposed below the display panel and configured to maintain the interval between the variable geometry electrode and the force sensor.

8. A vehicular display apparatus comprising:
a display panel;
a force sensor disposed at a bottom surface of the display panel and configured to measure a force touch by a user transferred through the display panel;
a sensor controller configured to compare a reference pressure with the measured force touch by the user and determine whether there is a touch manipulation intention of the user with respect to the display panel;
an application processor configured to, based on a result of determining whether there is touch manipulation intention of the user with respect to the display panel, selectively execute an application associated with a point, touched by the user, of the display panel; and
a variable geometry electrode disposed below and spaced apart from the force sensor with an interval therebetween,
wherein the force sensor measures, when the force touch by the user occurs, a variation in a capacitance value corresponding to a variation in a contact area of the force touch or the interval caused by the force touch by the user transferred through the display panel.

9. The vehicular display apparatus of claim 8, wherein:
in response to the force touch by the user being greater than or equal to the reference pressure, the sensor controller is configured to determine that there is the touch manipulation intention of the user with respect to the display panel, and
in response to the force touch by the user being less than the reference pressure, the sensor controller is configured to determine that the display panel is touched without the touch manipulation intention of the user.

10. The vehicular display apparatus of claim 8, wherein, in response to the sensor controller determining that there is the touch manipulation intention of the user with respect to the display panel, the application processor is configured to execute the application.

11. A method of determining a touch manipulation intention of a user with respect to a vehicular display apparatus, the method comprising:
   measuring a force touch corresponding to a touch event by a user with respect to a point on a display panel of the vehicular display apparatus, wherein the vehicular display apparatus includes (1) a force sensor disposed at a bottom surface of the display panel and (2) a variable geometry electrode disposed below and spaced apart from the force sensor with an interval therebetween;
   determining, based on the measured force touch by the user, whether there is the touch manipulation intention of the user with respect to the point on the display panel; and
   determining, based on determining whether there is the touch manipulation intention of the user with respect to the point on the display panel, whether to execute an application associated with the point on the display panel touched by the user,
   wherein measuring the force touch corresponding to the touch event by the user with respect to the point on the display panel comprises measuring a variation in a capacitance corresponding to a variation in a contact area of the force touch by the user transferred through the display panel.

12. The method of claim 11, wherein determining whether there is the touch manipulation intention of the user with respect to the point on the display panel comprises comparing the measured force touch with a reference pressure value.

13. The method of claim 12, wherein determining whether there is the touch manipulation intention of the user with respect to the display panel comprises:
   in response to the force touch being greater than or equal to the reference pressure value, determining that there is the touch manipulation intention of the user with respect to the display panel; and
   in response to the force touch being less than the reference pressure value, determining that the display panel is touched without the touch manipulation intention of the user.

14. The method of claim 11, further comprising executing the application in response to determining that there is the touch manipulation intention of the user with respect to the point on the display panel.

* * * * *